United States Patent
Zhou et al.

(10) Patent No.: US 9,635,521 B2
(45) Date of Patent: Apr. 25, 2017

(54) NETWORK REENTRY METHOD AND APPARATUS IN A MOBILE COMMUNICATION SYSTEM

(75) Inventors: Lei Zhou, Beijing (CN); Hai Wang, Beijing (CN); Xufeng Zheng, Beijing (CN)

(73) Assignee: SAMSUNG ELECTRONICS CO., LTD, Suwon-si, Gyeonggi-Do (KR)

(*) Notice: Subject to any disclaimer, the term of this patent is extended or adjusted under 35 U.S.C. 154(b) by 447 days.

(21) Appl. No.: 13/363,224

(22) Filed: Jan. 31, 2012

(65) Prior Publication Data

US 2012/0195258 A1    Aug. 2, 2012

(30) Foreign Application Priority Data

Jan. 31, 2011 (CN) .......................... 2011 1 0036008

(51) Int. Cl.
  *H04W 4/00* (2009.01)
  *H04W 4/08* (2009.01)
  *H04W 36/00* (2009.01)
  *H04W 8/18* (2009.01)
  *H04W 76/02* (2009.01)

(52) U.S. Cl.
  CPC ............. *H04W 4/08* (2013.01); *H04W 4/005* (2013.01); *H04W 4/006* (2013.01); *H04W 8/186* (2013.01); *H04W 36/0055* (2013.01); *H04W 76/028* (2013.01)

(58) Field of Classification Search
  CPC ..... H04W 80/04; H04W 84/12; H04W 88/06; H04W 88/08; H04W 84/18
  USPC ................................. 370/310, 324, 328, 331
  See application file for complete search history.

(56) References Cited

U.S. PATENT DOCUMENTS

| | | | |
|---|---|---|---|
| 2005/0041573 A1* | 2/2005 | Eom et al. | ..................... 370/208 |
| 2005/0058058 A1* | 3/2005 | Cho | ..................... H04W 74/002 370/208 |
| 2007/0032255 A1* | 2/2007 | Koo | ..................... H04W 56/002 455/512 |
| 2007/0082621 A1 | 4/2007 | Lee et al. | |
| 2007/0249347 A1* | 10/2007 | Saifullah et al. | ............. 455/436 |
| 2009/0046613 A1 | 2/2009 | Gaur | |
| 2009/0109932 A1* | 4/2009 | Maheshwari | ......... H04W 28/20 370/335 |

(Continued)

FOREIGN PATENT DOCUMENTS

| | | |
|---|---|---|
| CN | 1988411 A | 6/2007 |
| CN | 101926201 A | 12/2010 |

(Continued)

OTHER PUBLICATIONS

Xiangying Yang, et al., "Changes to fix errors in AAI-RNG-REQ and AAI-REQ-RSP messages", IEEE 802.16 Broadband Wireless Access Working Group, Jan. 12, 2011, 17 pages.

(Continued)

*Primary Examiner* — Hassan Phillips
*Assistant Examiner* — Siren Wei (57) ABSTRACT

Provided is a network re-entry method and apparatus in a mobile communication system. The network re-entry method includes sending, by a group delegate Mobile Station (MS) among MSs of a group, a ranging code based on a group Identifier (ID) to a Base Station (BS) and receiving, by the MSs, a Ranging-Response (RNG-RSP) message comprising a ranging status for the group from the BS.

50 Claims, 4 Drawing Sheets

(56) References Cited

U.S. PATENT DOCUMENTS

| | | | |
|---|---|---|---|
| 2009/0149179 A1* | 6/2009 | Shim | H04W 48/02 455/436 |
| 2010/0041399 A1* | 2/2010 | Kim | H04W 74/006 455/434 |
| 2010/0062772 A1 | 3/2010 | Peng et al. | |
| 2010/0112953 A1 | 5/2010 | Harris | |
| 2010/0150100 A1* | 6/2010 | Chen | H04L 5/0007 370/330 |
| 2010/0167743 A1* | 7/2010 | Palanki | H04B 7/155 455/436 |
| 2010/0238859 A1* | 9/2010 | Vukovic | H04W 74/0833 370/328 |
| 2010/0260071 A1* | 10/2010 | Lai | H04L 45/22 370/256 |
| 2011/0044287 A1 | 2/2011 | Park et al. | |

FOREIGN PATENT DOCUMENTS

| | | |
|---|---|---|
| JP | 2008-027011 | 2/2008 |
| KR | 1020050014315 A | 2/2005 |
| KR | 1020090066671 A | 6/2009 |

OTHER PUBLICATIONS

Written Opnion of the International Searching Authority dated Sep. 27, 2012 in connection with International Patent Application No. PCT/KR2012/000496.

The Notification of the First Office Action dated Aug. 29, 2014 in connection with Chinese Patent Application No. 201110036008.X; 11 pages.

Jeongki Kim, et al., "Group based ID allocation for M2M system", IEEE 802.16 Broadband Wireless Access Working Group, Dec. 30, 2010, 5 pages.

Lei Zhou, et al., "Proposed Text for network access entry for a large number of M2M devices", IEEE 802.16 Broadband Wireless Access Working Group, May 19, 2011, 4 pages.

Lei Zhou, et al., "Proposed Text for network access entry for a large number of M2M devices", IEEE 802.16 Broadband Wireless Access Working Group, Mar. 6, 2011, 6 pages.

Notification of Reason for Rejection dated Feb. 1, 2016 in connection with Japanese Patent Application No. 2013-551918.

Notice of Allowance dated May 30, 2016 in connection with Japanese Patent Application No. 2013-551918, 12 pages.

* cited by examiner

NETWORK REENTRY METHOD AND APPARATUS IN A MOBILE COMMUNICATION SYSTEM

CROSS-REFERENCE TO RELATED APPLICATION(S) AND CLAIM OF PRIORITY

The present application is related to and claims the benefit under 35 U.S.C. §119(a) of a Chinese Patent Application filed in the China Patent Trademark Office on Jan. 31, 2011 and assigned Serial No. 201110036008.X, the entire disclosure of which is hereby incorporated by reference.

TECHNICAL FIELD OF THE INVENTION

The present invention relates to mobile communication systems, and more particularly, to a network reentry method and apparatus in a mobile communication system.

BACKGROUND OF THE INVENTION

Figure 1:
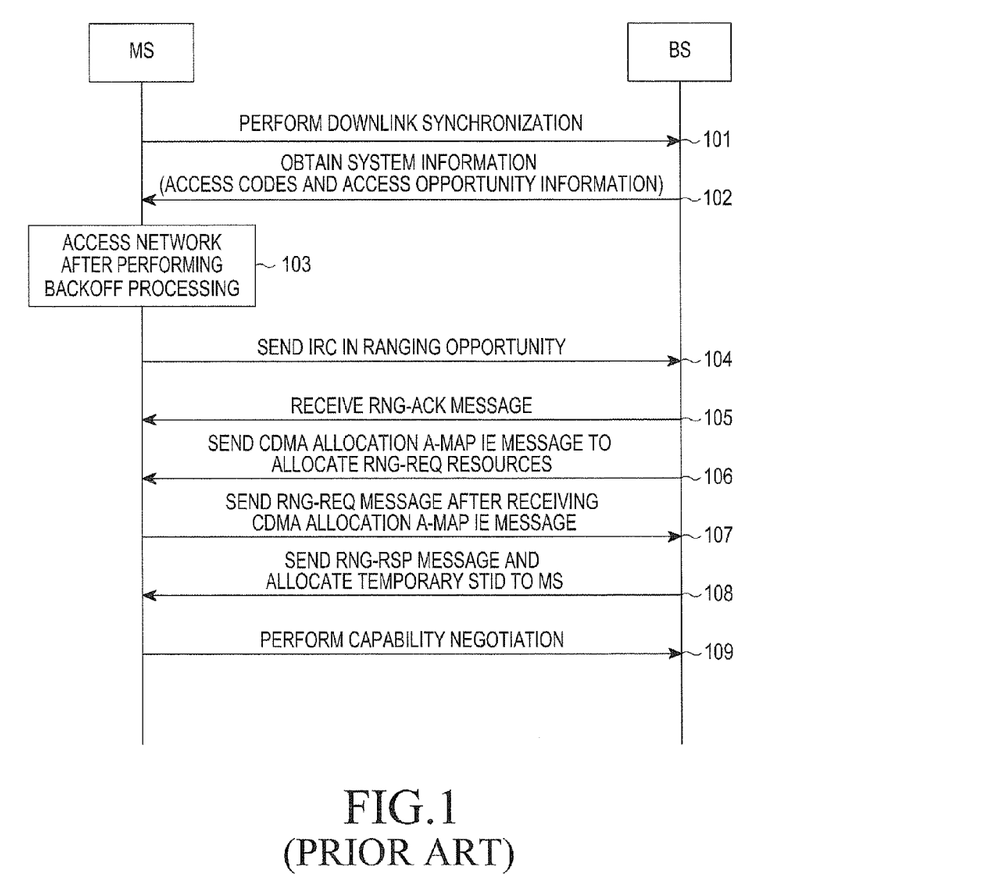
FIG. 1 illustrates an example operation between an MS and a BS in order for the MS to access the network in a conventional mobile communication system.

A Mobile Station (MS) usually operates according to a method shown in FIG. 1 to access a network. Herein, the access to the network may include reentry to the network.

FIG. 1 is a diagram illustrating an operation between an MS and a Base Station (BS) in order for the MS to access the network in a conventional mobile communication system.

Referring to FIG. 1, in step 101, the MS performs downlink synchronization. In step 102, the MS obtains system information from the BS. The system information generally includes access codes and access opportunity information.

In step 103, the MS accesses the network after performing backoff processing.

In step 104, the MS sends an Initial Reference Code (IRC) to a Base Station (BS) included in a ranging opportunity. In this step, when the MS has no available ranging opportunity, e.g., when the access operation has expired or the number of access operations exceeds a threshold, step 104 is continued or the access operation is terminated, the factors of which may be determined according to practical applications.

In step 105, the MS receives a Ranging-Acknowledgement (RNG-ACK) message or an Advanced Air Interface_Ranging-Acknowledgement (AAI_RNG-ACK) message from the BS, where the RNG-ACK message includes a response of the BS to the detected IRC.

In step 106, the BS sends a Code Division Multiple Access (CDMA) Allocation A-MAP Information Element (IE) message to the MS to allocate Ranging-Request (RNG-REQ) resources to the MS.

In step 107, the MS sends a RNG-REQ message to the BS after receiving the CDMA Allocation A-MAP IE message to inform the BS of information containing an Identifier (ID) of the MS, and then continues accessing the network.

In step 108, the BS sends a Ranging-Response (RNG-RSP) message to the MS and allocates a temporary Station Identifier (STID) to the MS.

In step 109, after the MS receives the RNG-RSP message, the BS and the MS perform capability negotiation, the MS sends a Registration-Request (REG-REQ) message to the BS, and then the BS sends a Registration-Response (REG-RSP) message that includes the STID to the MS.

Thus, through steps 101 through 109, the operation in which the MS accesses the network is completed.

Further, the MS may operate in the following order to access the network.

First, the MS obtains system information. Second, the MS sends an IRC to the BS in a ranging opportunity.

Again, the MS listens to and receives a RNG-ACK message or a CDMA Allocation A-MAP IE message from the BS, where the RNG-ACK message or the CDMA Allocation A-MAP IE message includes a response of the BS to the detected IRC. In this step, according to receiving instances, the MS may obtain the system information or terminate the access operation because of various factors, which may be determined according to practical applications. For example, the access operation may be terminated when the MS does not receive the response to the IRC sent by the MS and does not have an available ranging opportunity, e.g., when the access operation has expired, the number of access operations exceeds a threshold or, when the response received by the MS indicates "abort". According to receiving instances, the MS may send the IRC to the BS, for example, when the MS does not receive the response to the IRC sent by the MS and has an available ranging opportunity, or when the response received by the MS indicates "continue". When the response indicates "abort", the BS may configure a timer for the MS, and when the timer has timed out, the MS may access the network again.

When sending the IRC to the BS, the MS randomly selects the ranging opportunity and the IRC according to a backoff window.

Finally, the MS continues accessing the network after the MS receives the RNG-ACK message indicating "success" and/or the CDMA Allocation A-MAP IE message, and sends a RNG-REQ message to the BS to inform the BS of information containing an ID of the MS.

As can be seen from the above description, the conventional procedure that the MS accesses the network may be applicable to a single MS. In addition, the conventional MS obtains the IRC first when accessing the network, the IRC is selected randomly when the MS accesses the network, and the number of available IRCs is finite. Therefore, the conventional network access method for the MS may result in a conflict, such as when two or more MSs inadvertently select the same IRC, the MSs sending the same IRC may not all access the network successfully or all the MSs sending the same IRC may not access the network successfully. Especially, with the development of Machine to Machine (M2M) technology, more MSs may access the network at the same time, which increases the possibility of conflict, and thus result in that some MSs cannot access the network successfully.

SUMMARY OF THE INVENTION

To address the above-discussed deficiencies of the prior art, it is a primary object to provide a network access method and apparatus which allows a plurality of MSs to access a network in a mobile communication system.

According to an aspect of the present invention, there is provided a network reentry method in a mobile communication system, the method including sending, by a group delegate Mobile Station (MS) among MSs of a group, a ranging code based on a group Identifier (ID) to a Base Station (BS) and receiving, by the MSs, a Ranging-Response (RNG-RSP) message comprising a ranging status for the group from the BS.

According to another aspect of the present invention, there is provided a network reentry method at a Base Station (BS) in a mobile communication system, the method including allocating a dedicated ranging code to a group delegate Mobile Station (MS) among MSs of a group, receiving a ranging code based on a group Identifier (ID) generated according to the dedicated ranging code from the group delegate MS, and sending a Ranging-Response (RNG-RSP) message comprising a ranging status for the group to the MSs.

According to another aspect of the present invention, there is provided a network reentry apparatus in a mobile communication system, the apparatus including a controller by which a group delegate Mobile Station (MS) among MSs of a group determines a ranging code based on a group Identifier (ID), a sender by which the group delegate MS sends the ranging code based on the group ID to a Base Station (BS), and a receiver by which the MSs receive a Ranging-Response (RNG-RSP) message comprising a ranging status for the group from the BS.

According to another aspect of the present invention, there is provided a network reentry apparatus at a Base Station (BS) in a mobile communication system, the apparatus including a controller for allocating a dedicated ranging code to a group delegate Mobile Station (MS) among MSs of a group, a receiver for receiving a ranging code based on a group Identifier (ID) generated according to the dedicated ranging code from the group delegate MS, and a sender for sending a Ranging-Response (RNG-RSP) message comprising a ranging status for the group to the MSs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 2:
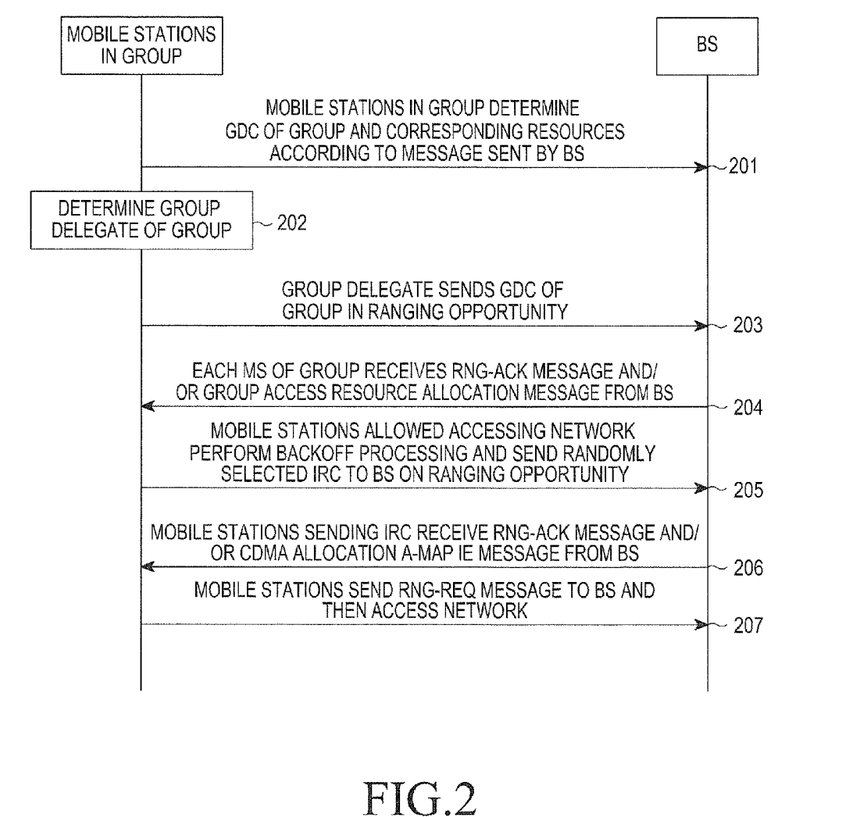
FIG. 2 illustrates an example operation between an MS and a BS in order for the MS to access the network in a mobile communication system according to a first embodiment of the present invention.
Figure 3:
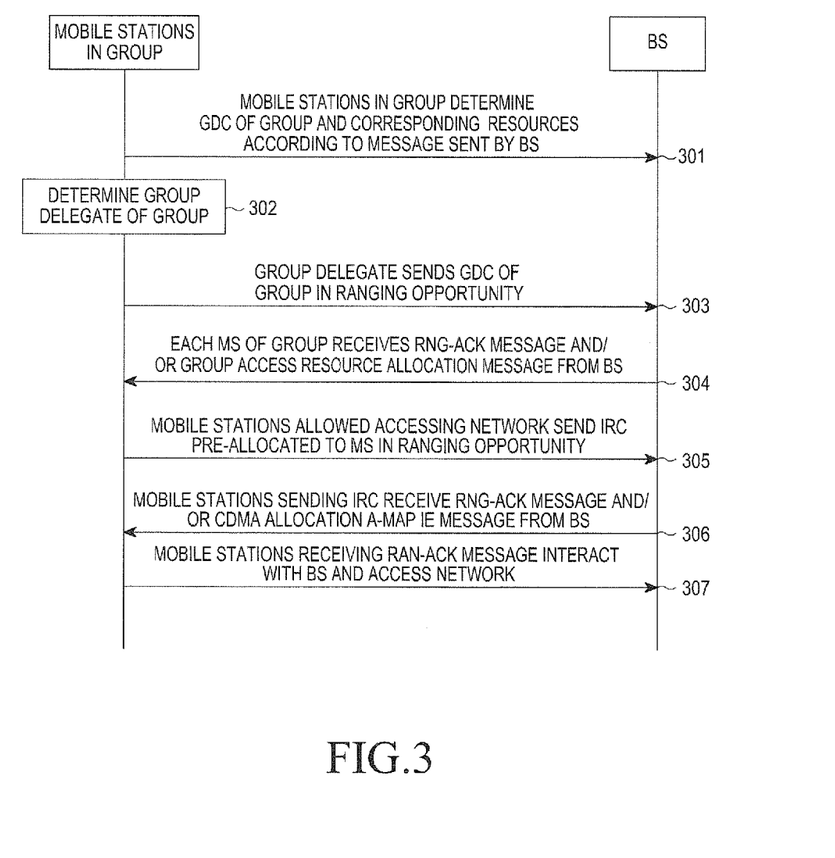
FIG. 3 illustrates an example operation between an MS and a BS in order for the MS to access the network in a mobile communication system according to a second embodiment of the present invention.
Figure 4:
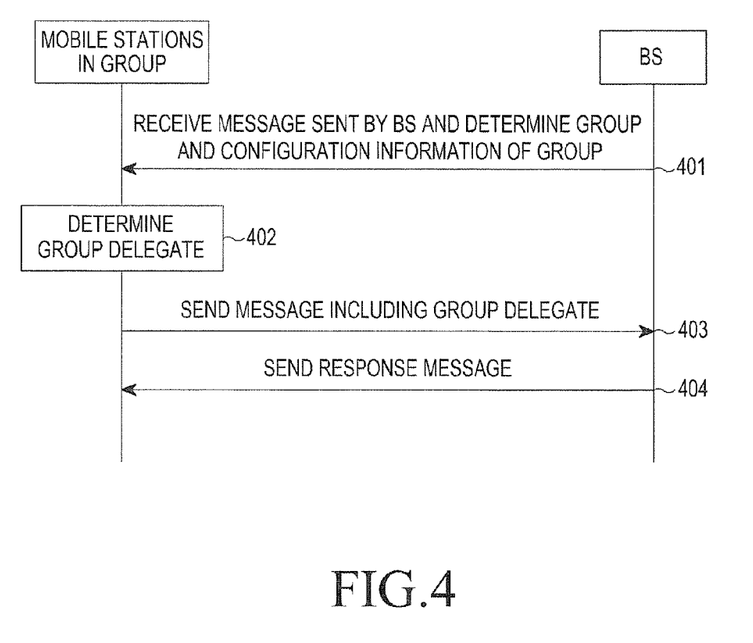
FIG. 4 illustrates an example method for selecting a group delegate through communication between an MS and a BS according to one or more embodiments of the present invention.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication networks. Hereinafter, exemplary embodiments of the present invention will be described in more detail with reference to the accompanying drawings. Herein, only necessary parts for understanding of operations according to the present invention will be described, and other parts will not be described not to obscure the subject matter of the present invention.

Before describing specific embodiments, concepts of group, group delegate and group member will be described.

The group includes an entity composed of MSs that have one or more common attributes, where the one or more common attributes may be the same or similar service, the same or similar reporting period, belonging to the same subscriber, adjacent geography location, and so on.

The group delegate is a certain MS which can represent all or particular part of MSs in the group to execute a specific function. There may alternatively be one or more group delegates in one group, and the group delegate may be any one MS in the group.

The group members are the MSs other than the group delegate in the group.

It should be described that, when the embodiments of the present invention are to be implemented, the MSs may be delegated into groups in advance according to one or more common attributes, which can be performed according to a conventional mode.

It should also be noted that, in order to decrease the number of MSs accessing the network over a period of time, the period of time in which the MSs access the network may be delineated into time segments, so that a finite number of MSs may access the network in a certain time segment, for decreasing potential conflict.

In order for the MS to access the network in a mobile communication system, the following operations are performed between the MS and the BS according to certain embodiments of the present invention. Herein, operations will be described in which the MSs are initially delegated in groups and a group delegate for each group is selected. A method for selecting the group delegate will be described in detail for each embodiment.

In a first embodiment of the present invention, a MS first learns of its own group according to a message sent by the BS or according to a preconfiguration mode. The MSs in each group determine a GDC of the group according to the message sent by the BS. The group delegate sends the Group Delegate Code (GDC) allocated to the group to the BS in a ranging opportunity. Each MS in the group receives a RNG-ACK message and/or a group access resource allocation message from the BS. After receiving backoff information broadcasted by the BS and performing backoff processing, a MS receiving a message of allowing accessing the network in the group sends a randomly selected IRC to the BS on the ranging opportunity.

The MS sending the IRC receives the RNG-ACK message and/or a CDMA Allocation A-MAP IE message from the BS, where the RNG-ACK message and/or the CDMA Allocation A-MAP IE message includes a response to the MS sending the IRC. After receiving the RNG-ACK message and/or the CDMA Allocation A-MAP IE message, the MS sends a RNG-REQ message to the BS and thereafter accesses the network.

In a second embodiment, a MS learns its own group according to a message sent by the BS or according to a preconfiguration mode. The MSs in each group determine a GDC of the group according to the message sent by the BS. The group delegate sends the GDC to the BS in a ranging opportunity. Each MS in the group receives a RNG-ACK message from the BS. An MS receiving a message of allowing access to the network in the group sends a pre-allocated IRC to the BS on the ranging opportunity.

The MS sending the IRC receives the RNG-ACK message and/or a CDMA Allocation A-MAP IE message from the BS, where the RNG-ACK message and/or the CDMA Allocation A-MAP IE message includes a response to the MS sending the IRC. After receiving the RNG-ACK message and/or the CDMA Allocation A-MAP IE message, the MS sends a RNG-REQ message to the BS and thereafter accesses the network.

In order to make the object(s), technical solution(s) and merits of the present invention clearer, the first and second embodiments of the present invention will be described in detail hereinafter with reference to FIGS. 2 and 3.

FIG. 2 illustrates an example operation between an MS and a BS for the MS to access the network in a mobile communication system. Although not shown in the drawings, each of the MS and the BS includes at least a sender, a receiver, and a controller, and the sender and the receiver transmit and receive messages, and the controller of the MS and the BS controls the operations according to the first embodiment of the present invention.

Referring to step 201, MSs in a group determine a GDC of the group and corresponding resources according to a message sent by a BS. It should be described that the GDC may also be called as a Group Access Code, or a Group Initial Reference Code (GIRC) or a ranging code. The GDC may include one or more codes. The GDC may be a code in a conventional IRC, or a code reallocated to the MSs by the system.

Each group may correspond to an initial GDC, and the initial GDC based on the group ID can be obtained according to a following formula:

$$C_{M2M\ group\ RP} = \mathrm{mod}(ID_{M2M\ Group}, N_{M2M\ group}) \quad (1),$$

wherein $ID_{M2M\ Group}$ is a group ID, $N_{M2M\ group}$ is the number of GDCs, and mod( ) represents obtaining modulus.

If one frame includes multiple random access opportunities, each group selects a random access opportunity according to a following formula:

$$Idx_{Ranging\ opp} = \mathrm{mod}(\mathrm{floor}(ID_{M2M\ Group}/N_{M2M\ group}), N_{Opp}) \quad (2),$$

wherein $N_{Opp}$ is the number of random access opportunities, and floor( ) represents taking an integer not larger than the number of random access opportunities.

The GDCs of group and M2M additional initial ranging codes should be orthogonal with GDCs because these ranging codes are transmitted on a random access opportunity and need to be fully utilized. To this end, a code dynamic partitioning method may be adopted. By the code dynamic partitioning method, the orthogonal intersection between two kinds of codes may be guaranteed, code resources can be fully utilized, and the BS may identify access motives of different MSs according to different kinds of codes. Specifically, there are two code dynamic partitioning methods:

1. If a Zadoff-Chu sequence with a cyclic shift function is used for generating the GDC, the Zadoff-Chu sequence may be defined as:

$$X_p(k) = \exp(-j \cdot \pi \cdot (r_p \cdot k(k+1) + 2 \cdot k \cdot s_p \cdot N_{CS})/N_{RP}) \quad (3),$$

where k=0, 1, . . . , NRP−1, where p is a sequence number of the GDC. $r_p$ may be defined as:

$$r_p = \mathrm{mod}\left(\left(1 - 2 \cdot \mathrm{mod}\left(\left\lfloor \frac{p}{M_{ns}} \right\rfloor, 2\right)\right) \cdot \left(\left\lfloor \frac{\frac{p}{M_{ns}}}{2} \right\rfloor + r_{ns0}\right) + N_{RP}, N_{RP}\right), \quad (4)$$

wherein p=0, 1, 2 . . . $N_{cont-1}$, $N_{cont}+N_{dedi}$, . . . , $N_{cont}+N_{dedi}+N_{M2M\ group}+N_{M2M\ Add}-1$, $s_p=\mathrm{mod}(p,M_{ns})$. $r_{ns0}$ is broadcasted in a Secondary-Super Frame Header (S-SFH), $M_{ns}$ is the times of cyclic shift of the Zadoff-Chu sequence's root, $N_{cont}$ is a sum of initial ranging codes $N_{IN}$ for general random access and handover ranging codes $N_{HO}$, $N_{dedi}$ is dedicated ranging codes, $N_{M2M\ group}$ is GDCs, $N_{M2M\ Add}$ is newly-added initial ranging codes for an M2M application. There is no intersection between two kinds of codes. Specifically, $N_{cont}$ is a sum of the number (0~$N_{IN}$−1) of initial ranging codes $N_{IN}$ for general random access in each sector and the number ($N_{IN}$~$N_{IN}+N_{HO}$−1) of handover ranging codes, $N_{dedi}$ is dedicated Ranging codes, which is represented with ($N_{cont}$~$N_{cont}+N_{dedi}$−1) and includes 32 dedicated ranging codes at most, $N_{M2M\ group}$ is GDCs allocated to the M2M group by each sector, which is represented with ($N_{cont}+N_{dedi}$~$N_{cont}+N_{dedi}+N_{M2M\ group}$−1) and includes a maximum of 32 GDCs, and $N_{M2M\ add}$ is newly-added initial ranging codes for an M2M application, which is represented with ($N_{cont}+N_{dedi}+N_{M2M\ group}$~$N_{cont}+N_{dedi}+N_{M2M\ group}+N_{M2M\ add}$−1) and includes a maximum of 32 additional ranging codes. The M2M MS may randomly select ranging codes from the initial ranging codes $N_{IN}$ for general random access and $N_{M2M\ add}$ to perform initial access. $N_{CS}$ is a unit of cyclic shift, and $N_{RP}$ is the length of ranging codes.

The foregoing is only an example, the allocation of ranging codes may be performed in a sequence, but the sequence of allocating the GDCs of the M2M group and allocating the M2M additional codes may be unimportant, the M2M additional codes may be allocated initially, and then the GDCs of the M2M group may be allocated. Table 1 shows how GDCs are allocated of the M2M group and the M2M additional codes, and how a subset or deduction of this table may be used in practical applications.

TABLE 1

| | Partition Index | | | | | | | | | | | | | | | | | | | | | |
|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| Number of the M2M Group codes, $N_{M2M\ Group}$ | 0 | 0 | 0 | 0 | 0 | 0 | 0 | 8 | 8 | 8 | 8 | 8 | 8 | 8 | 8 | 8 | 16 | 16 | 16 | 16 | 16 | 16 |
| Number of the M2M additional code $N_{M2M\ Add}$ | 8 | 16 | 32 | 40 | 48 | 56 | 64 | 0 | 8 | 16 | 24 | 32 | 40 | 48 | 56 | 64 | 0 | 8 | 16 | 24 | 32 | 40 |

| | Partition Index | | | | | | | | | | | | | | | | | | |
|---|---|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 36 | 37 | 38 | 39 | 40 |
| Number of the M2M Group codes, $N_{M2M\ Group}$ | 16 | 24 | 24 | 24 | 24 | 24 | 24 | 32 | 32 | 32 | 32 | 32 | 40 | 40 | 40 | 40 | 48 | 48 | 48 |
| Number of the M2M additional code $N_{M2M\ Add}$ | 48 | 0 | 8 | 16 | 24 | 32 | 40 | 0 | 8 | 16 | 24 | 32 | 0 | 8 | 16 | 24 | 0 | 8 | 16 |

| | Partition Index | | |
|---|---|---|---|
| | 22 | 23 | 24 |
| Number of the M2M Group codes, $N_{M2M\ Group}$ | 56 | 56 | 64 |
| Number of the M2M additional code $N_{M2M\ Add}$ | 0 | 8 | 0 |

Since the dedicated ranging codes and the regular codes are transmitted on different ranging resources, the allocation of the dedicated ranging codes may not be considered, but only the initial ranging codes $N_{IN}$ for general random access and the handover ranging codes $N_{HO}$ are considered. $N_{M2M\ group}$ is GDCs allocated to the M2M group by each sector, which is represented with ($N_{cont} \cdot N_{cont} + N_{M2M\ group} - 1$), and $N_{M2M\ add}$ is newly-added ranging codes for an M2M application, which is represented with ($N_{cont} + N_{M2M\ group} \sim N_{cont} + N_{M2M\ group} + N_{M2M\ add} - 1$). If the handover ranging codes are not considered, other codes except regular initial access ranging codes are all allocated to M2M group GDCs and M2M additional codes. $N_{M2M\ group}$ may be represented with ($N_{IN} \sim N_{IN} + N_{M2M\ group} - 1$), and $N_{M2M\ add}$ may be represented with ($N_{IN} + N_{M2M\ group} \sim N_{IN} + N_{M2M\ group} + N_{M2M\ add} - 1$).

Table 2 shows a schematic code allocation table. The number of initial ranging codes $N_{IN}$ for general random access is represented with ($0 \sim N_{IN} - 1$), and the number of handover ranging codes is represented with ($N_{IN} \sim N_{IN} + N_{HO} - 1$). $N_{M2M\ add}$ is newly-added initial codes for an M2M application, which is represented with ($N_{IN} + N_{HO} \sim N_{IN} + N_{HO} + N_{M2M\ add} - 1$) and includes a maximum of 32 additional ranging codes, $N_{M2M\ group}$ is GDCs allocated to the M2M group by each sector, which is represented with ($N_{IN} + N_{HO} + N_{M2M\ add} \sim N_{IN} + N_{HO} + N_{M2M\ add} + N_{M2M\ group} - 1$) and includes a maximum of 32 GDCs. 16 types of configuration may be represented with 4 bits of information, and thus, the allocation of different kinds of codes shown in Table 2 may be obtained using 4 bits of a superframe header. If the number of redundant codes is finite, such as 32 codes, the GDCs and the newly-added initial ranging codes for an M2M application may share the codes. The specific allocation refers to a code allocation table shown in Table 3. For a case that the number of codes is finite, the GDCs and the newly-added initial ranging codes for an M2M application may share the codes, but the sharing proportion is not limited to Table 3.

TABLE 2

| | Partition Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Number of the initial RP codes, $N_{IN}$ | 8 | 8 | 8 | 8 | 16 | 16 | 16 | 16 | 24 | 24 | 24 | 24 | 32 | 32 | 32 | 32 |
| Number of the handover RP codes, $N_{HO}$ | 8 | 16 | 24 | 32 | 8 | 16 | 24 | 32 | 8 | 16 | 24 | 32 | 8 | 16 | 24 | 32 |

TABLE 2-continued

| | Partition Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Number of the M2M additional codes $N_{M2M\ Add}$ | 8 | 16 | 24 | 32 | 8 | 16 | 24 | 32 | 8 | 16 | 24 | 32 | 8 | 16 | 24 | 32 |
| Number of the M2M Group codes, $N_{M2M\ Group}$ | 8 | 8 | 8 | 8 | 16 | 16 | 16 | 16 | 24 | 24 | 24 | 24 | 32 | 32 | 32 | 32 |

TABLE 3

| | Partition Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Number of the initial RP codes, $N_{IN}$ | 8 | 8 | 8 | 8 | 16 | 16 | 16 | 16 | 24 | 24 | 24 | 24 | 32 | 32 | 32 | 32 |
| Number of the handover RP codes, $N_{HO}$ | 8 | 16 | 24 | 32 | 8 | 16 | 24 | 32 | 8 | 16 | 24 | 32 | 8 | 16 | 24 | 32 |
| Number of the M2M additional code $N_{M2M\ Add}$ | 8 | 16 | 24 | 32 | 8 | 16 | 24 | 32 | 8 | 16 | 24 | 32 | 8 | 16 | 24 | 32 |
| Number of the M2M Group codes, $N_{M2M\ Group}$ | 24 | 16 | 8 | 0 | 24 | 16 | 8 | 0 | 24 | 16 | 8 | 0 | 24 | 16 | 8 | 0 |

2. If a ranging opportunity is allocated to a synchronized AMS, the initial ranging codes may be extended, and Zadoff-Chu sequences with filling and cyclic shift functions may be taken as the ranging codes, which are represented by:

$$X_p(n,k) = \exp((-j\cdot\pi(r_p\cdot(n\cdot71+k)\cdot(n\cdot71+k+1))/211 + 2\cdot k\cdot s_p\cdot N_{rcs}/N_{FFT})), \quad (5),$$

wherein K=0, 1, ..., $N_{RP}$−1; n=0, 1, 2, where p is a sequence number of the ranging code. $r_p$ may be defined as:

$$r_p = \mod\left(\left(1 - 2\cdot\mod\left(\left\lfloor\frac{p}{M_s}\right\rfloor, 2\right)\right)\cdot\left(\left\lfloor\frac{\left\lfloor\frac{p}{M_{ns}}\right\rfloor}{2}\right\rfloor + r_{ns0}\right) + 211, 211\right), \quad (6)$$

wherein p=0, 1, 2 ... $N_{cont}$−1, $N_{cont}$+$N_{dedi}$, ..., $N_{cont}$+$N_{dedi}$+$N_{M2M\ group}$+$N_{M2M\ Add}$−1, and $s_p$=mod(p,$M_s$).

For a home BS, $N_{cont}$ represents ranging codes for general initial access, the sum $N_{dedi}$ of the handover codes and periodic ranging codes are dedicated ranging codes, $N_{M2M\ group}$ is GDCs allocated to the M2M group, and $N_{M2M\ Add}$ is additional codes for an M2M application. There is no intersection between two kinds of codes. $N_{cont}$ is a sum of the number (0~$N_{IN}$−1) of ranging codes for general initial access in each sector, the number ($N_{IN}$~$N_{IN}$+$N_{HO}$−1) of handover ranging codes and the number ($N_{IN}$+$N_{HO}$~$N_{IN}$+$N_{HO}$+$N_{PE}$−1) of periodic ranging codes. $N_{dedi}$ is dedicated ranging codes, which is represented with ($N_{cont}$~$N_{cont}$+$N_{dedi}$−1) and includes a maximum of 32 ranging codes, $N_{M2M\ add}$ is newly-added codes for an M2M application, which is represented with $N_{cont}$+$N_{dedi}$~$N_{cont}$+$N_{dedi}$+$N_{M2M\ add}$−1) and includes a maximum of 32 ranging codes. $N_{M2M\ group}$ is codes allocated to the M2M group by each sector, which is represented with ($N_{cont}$+$N_{dedi}$+$N_{M2M\ add}$~$N_{cont}$+$N_{dedi}$++$N_{M2M\ add}$+$N_{M2M\ group}$−1) and includes a maximum of 32 ranging codes. The M2M MS may randomly select GDC ranging codes from $N_{IN}$ and $N_{M2M\ add}$ to perform initial access. Since the dedicated ranging codes and the regular codes are transmitted on different ranging resources, the allocation of the dedicated ranging codes may not be considered, while only the initial ranging codes $N_{IN}$ for general random access, the handover ranging codes $N_{HO}$ and the periodic ranging codes are considered. $N_{M2M\ add}$ is newly-added codes for an M2M application, which is represented with ($N_{cont}$~$N_{cont}$+$N_{M2M\ add}$−1) and includes a maximum of 32 ranging codes. $N_{M2M\ group}$ is codes allocated to the M2M group by each sector, which is represented with ($N_{cont}$+$N_{M2M\ add}$~$N_{cont}$+$N_{M2M\ add}$+$N_{M2M\ group}$−1) and includes a maximum of 32 ranging codes. Table 4 shows an example code allocation table, which is a subset or deduction of this table may be used in practical applications. The foregoing is only an example, the allocation of ranging codes may be performed in a sequence, but the sequence of allocating the GDCs of the M2M group and allocating the M2M addition codes is unimportant, the M2M addition codes may be allocated initially, and then the GDCs of the M2M group may be allocated.

TABLE 4

| Partition Index | Number of the initial RP codes, NIN | Number of the handover RP codes, NHO | Number of the periodic RP codes, NPE | Number of M2M Add $N_{M2M\ Add}$ | Number of M2M Group $N_{M2M\ group}$ |
|---|---|---|---|---|---|
| 0 | 4 | 4 | 4 | 4 | 4 |
| 1 | 4 | 8 | 4 | 8 | 4 |
| 2 | 4 | 16 | 4 | 16 | 4 |
| 3 | 4 | 24 | 4 | 24 | 4 |
| 4 | 8 | 4 | 8 | 4 | 8 |
| 5 | 8 | 8 | 8 | 8 | 8 |
| 6 | 8 | 16 | 8 | 16 | 8 |
| 7 | 8 | 24 | 8 | 24 | 8 |
| 8 | 16 | 4 | 16 | 4 | 16 |
| 9 | 16 | 8 | 16 | 8 | 16 |
| 10 | 16 | 16 | 16 | 16 | 16 |
| 11 | 16 | 24 | 16 | 24 | 16 |

TABLE 4-continued

| Partition Index | Number of the initial RP codes, NIN | Number of the handover RP codes, NHO | Number of the periodic RP codes, NPE | Number of M2M Add $N_{M2M\ Add}$ | Number of M2M Group $N_{M2M\ group}$ |
|---|---|---|---|---|---|
| 12 | 24 | 4 | 24 | 4 | 24 |
| 13 | 24 | 8 | 24 | 8 | 24 |
| 14 | 24 | 16 | 24 | 16 | 24 |
| 15 | 24 | 24 | 16 | 24 | 24 |

For a case that a ranging GDC opportunity multiplexes Frequency Division Multiplex (FDM) resources in a wireless Metropolitan Area Network-Orthogonal Frequency Division Multiple Access (MAN-OFDMA) system and an advanced wireless MAN-OFDMA system, the number of ranging GDCs may be 256, each BS uses one group of ranging GDCs, and the initial number of the ranging GDCs in this group is rns0, a sequence which can be used by the BS is between rns0 and $((N_{IN}+N_{HO}+N_{PE}+N_{dedi}+N_{M2M\ group}+N_{M2M\ add})$ mod 256). $N_{IN}$ is initial ranging GDCs, $N_{HO}$ is initial handover ranging GDCs, $N_{PE}$ is periodic ranging GDCs, $N_{dedi}$ is dedicated ranging GDCs, $N_{M2M\ group}$ is group ranging GDCs, and $N_{M2M\ add}$ is M2M additional ranging GDCs.

The number of codes contained in the $N_{M2M\ add}$ is a maximum of 32, and the $N_{M2M\ add}$ is obtained through shifting from $144\times((rns0+N_{IN}+N_{HO}+N_{PE}+N_{dedi})$ mod 256) to $144\times((rns0+N_{IN}+N_{HO}+N_{PE}+N_{dedi}+N_{M2M\ add})$ mod 256)−1 by a Pseudo Random Binary Sequence (PRBS) generator.

The number of codes included in the $N_{M2M\ group}$ is a maximum of 32, and the $N_{M2M\ group}$ is obtained through shifting from $144\times((rns0+N_{IN}+N_{HO}+N_{PE}+N_{dedi}+N_{M2M\ add})$ mod 256) to $144\times((rns0+N_{IN}\ N_{HO}+N_{PE}+N_{dedi}+N_{M2M\ add}+N_{M2M\ group})$ mod 256)−1 by the PRBS generator.

Since the dedicated ranging codes and the regular codes occupy different resources, the allocation of the dedicated ranging codes may not be considered, but only the initial ranging codes, the handover ranging codes and periodic ranging codes are considered. The number of codes contained in the $N_{M2M\ add}$ is a maximum of 32, and is obtained through shifting from $144\times((rns0+N_{IN}+N_{dedi})$ mod 256) to $144\times((rns0+N_{IN}+N_{dedi}+N_{M2M\ add})$ mod 256)−1 by the PRBS generator. The number of codes contained in the $N_{M2M\ group}$ is a maximum of 32 codes, and is obtained through shifting from $144\times((rns0+N_{IN}+N_{dedi}+N_{M2M\ add})$ mod 256) to $144\times((rns0+N_{IN}+N_{dedi}+N_{M2M\ add}+N_{M2M\ group})$ mod 256)−1 by the PRBS generator. The $N_{M2M\ group}$ is codes allocated to the M2M group by each sector, which can be obtained through shifting from $144\times((rns0+N_{IN}+N_{HO}+N_{PE})$ mod 256) to $144\times((rns0+N_{IN}+N_{HO}+N_{PE}+N_{M2M\ group})$ mod 256)−1 by the PRBS generator.

If the handover codes and periodic codes are not considered, other codes except regular initial ranging codes are all allocated to the M2M group and the additional codes, the $N_{M2M}$ add may be obtained through shifting from $144\times((rns0+N_{IN})$ mod 256) to $144\times((rns0+N_{IN}+N_{M2M\ add})$ mod 256)−1 by the PRBS generator, and the $N_{M2M\ group}$ may be obtained through shifting from $144\times((rns0+N_{IN}+N_{M2M\ add})$ mod 256) to $144\times((rns0+N_{IN}+N_{M2M\ group}+N_{M2M\ add})$ mod 256)−1 by the PRBS generator. Table 5 shows the allocation of the $N_{M2M\ group}$ and the $N_{M2M\ Add}$.

TABLE 5

| | Partition Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Number of the M2M Group codes, NM2M Group | 8 | 8 | 8 | 8 | 16 | 16 | 16 | 16 | 24 | 24 | 24 | 24 | 32 | 32 | 32 | 32 |
| Number of the M2M additional code NM2M Add | 8 | 16 | 24 | 32 | 8 | 16 | 24 | 32 | 8 | 16 | 24 | 32 | 8 | 16 | 24 | 32 |

Though codes for an M2M application are added, more ranging opportunities are used to increase access resources, so that more M2M MSs can access the network. Therefore, new random access opportunities are defined in the present invention. Since each superframe includes 4 frames and the first and second frames are respectively allocated to the regular initial access opportunity and a synchronized access opportunity, the ranging resources of the third and fourth frames are taken as the M2M additional initial access opportunity in the present invention. The specific access opportunity allocation is shown in Table 6.

Table 6 shows four allocation cases:

Case1: Dedicated ranging channel for M2M is allocated/configured in every frame of one superframe.

Case2: Dedicated ranging channel for M2M is allocated/configured in third frame of one superframe and does not conflict with normal/regular ranging opportunities.

Case3: Dedicated ranging channel for M2M is allocated/configured in fourth frame of one superframe and does not conflict with normal/regular ranging opportunities.

Case4. Dedicated ranging channel for M2M is allocated/configured in third and fourth frame of one superframe and does not conflict with normal/regular ranging opportunities. The M2M group GDCs and M2M additional codes may be transmitted in an original regular initial access opportunity, an additional initial access opportunity and a dynamic initial access opportunity.

TABLE 6

| Configurations | The AAI subframe allocating the NS-RCH |
|---|---|
| 0 | $(OSF + 2)^{th}$ UL AAI subframe in every frame except the AAI subframe that has already been used for a regular allocation. |
| 1 | $OSF^{th}$ UL AAI subframes in the third frame in every superframe except the AAI subframe that has already been used for a regular allocation. |

TABLE 6-continued

| Configurations | The AAI subframe allocating the NS-RCH |
|---|---|
| 2 | OSF$^{th}$ UL AAI subframe in the third frame in every even numbered superframe, i.e., mod(superframe number, 2) = 0 except the AAI subframe that has already been used for a regular allocation. |
| 3 | OSF$^{th}$ UL AAI subframe of the third frame in every 4$^{th}$ superframe, i.e. mod(superframe number, 4) = 0 except the AAI subframe that has already been used for a regular allocation. |
| 4 | OSF$^{th}$ UL AAI subframes in the last frame in every superframe except the AAI subframe that has already been used for a regular allocation. |
| 5 | OSF$^{th}$ UL AAI subframe in the last frame in every even numbered superframe, i.e., mod(superframe number, 2) = 0 except the AAI subframe that has already been used for a regular allocation. |
| 6 | OSF$^{th}$ UL AAI subframe of the last frame in every 4$^{th}$ superframe, i.e. mod(superframe number, 4) = 0 except the AAI subframe that has already been used for a regular allocation. |
| 7 | OSF$^{th}$ UL AAI subframes in the third and last frame in every superframe except the AAI subframe that has already been used for a regular allocation. |
| 8 | OSF$^{th}$ UL AAI subframe in the third and last frame in every even numbered superframe, i.e., mod(superframe number, 2) = 0 except the AAI subframe that has already been used for a regular allocation. |
| 9 | OSF$^{th}$ UL AAI subframe of the third and last frame in every 4$^{th}$ superframe, i.e. mod(superframe number, 4) = 0 except the AAI subframe that has already been used for a regular allocation. |

Table 7 shows the M2M group GDCs and the M2M additional ranging codes broadcasted in S-SFH SP1, while Table 8 shows the support that the BS responds to the received initial ranging codes including regular initial ranging codes and additional ranging codes sent by M2M with an ACK message in an AAI-RNG-ACK message. Table 9 shows the support that the BS responds to the M2M group GDCs with an ACK message in an AAI-RNG-ACK message.

TABLE 7

| Syntax | Size (bit) | Description |
|---|---|---|
| ... | ... | ... |
| Reserved | | |
| Support of M2M devices | 1 | Indicates whether system supports M2M devices or not 0b0: No support 0b1: Support |
| If (Support of M2M devices) | | Indicates support of the M2M devices, when Support of M2M devices is 0b1 |
| The M2M Group and individual additional RP code partition information for the NS-RCH | 4 | Indicates the number of M2M Group and individual additional initial RP codes (NM2M group and NM2M add) according to the Table 1 or 2. |
| Allocation periodicity of the additional NS-RCH for M2M devices | 4 | Indicates the periodicity of the additional NS-RCH allocation for M2M devices according to the Table 5. |
| Start RP code information of the NS-RCH | 4 | Indicates the kns which is the parameter controlling the start root index of the RP codes (rns0). rns0 (kns) = 4×kns + 1 for NS-RCH format 0. rns0 (kns) = 16×kns + 1 for NS-RCH format 1. The range of values is 0 ≤ kns ≤ 15 |
| Number of the cyclic shifted RP codes per root index for the NSRCH | 2 | Indicates the number of cyclic shifted codes per root index (Mns) for RP codes |
| Subframe offset of the additional NS-RCH for M2M devices | 2 | Indicates the subframe offset (OSF) of the NS-RCH allocation related to the Table 5 except the AAI subframe that has already been used for a regular allocation. |
| NS-RCH formats | 1 | Indicates the NS-RCH formats |

TABLE 8

| Field | Size (bits) | (bits) | Description |
|---|---|---|---|
| ... | ... | ... | ... |
| For (j = 0; j<N_Received_Codes; j++) { | | The number of ranging preamble code indices (i.e. N_Received_Codes)[1 ... 64] detected in this corresponding ranging opportunity. | N_Received_Codes should include additional M2M initial ranging codes if M2M additional initial ranging code is supported |
| Index Ranging preamble code | 6 | Index received in this ranging opportunity. | Index should indicate additional M2M initial ranging codes if M2M additional initial ranging code is supported |
| Ranging Status | 2 | Indicate whether ranging preamble code or UL burst is received within acceptable limits by ABS. | |

TABLE 8-continued

| Field | Size (bits) | Description |
|---|---|---|
| | | 0b00 = success<br>0b01 = abort<br>0b10 = continue |
| If (Ranging Status == 0b01) { | | |
| Ranging Abort Timer | 16 | Timer defined by an ABS to prohibit the AMS from attempting network entry at this ABS, for a specific time duration.<br>Value: 0 (Do not try ranging again at the ABS.)<br>Value: 1-65535, In units of seconds |
| }else if (Ranging Status ==0b10) { | | |
| Adjustment parameters indication (API) | 3 | Bit#0: Time offset adjustment indication.<br>Bit#1: Power level adjustment indication<br>Bit#2: Frequency offset adjustment Indication |
| If( API Bit#0==0b1 ) { | | |
| Timing offset adjustment | 15 | |
| }<br>If( API Bit#1==0b1 ) { | | |
| Power level adjustment | 4 | |
| }<br>If (API Bit#2==0b1) { | | |
| Frequency offset adjustment | 9 | |
| }<br>}<br>}<br>}<br>. . . | . . . . . . | . . . |

TABLE 9

| Field | Size (bits) | Value/Description | Condition |
|---|---|---|---|
| For (j=0; j<N_Received_Codes for M2M group; j++) { | | The number of ranging preamble code indices(i.e. N_Received_Codes)[1 . . . 64] detected in this corresponding ranging opportunity. | |
| Ranging Status | 2 | Indicate whether ranging preamble code or UL burst is received within acceptable limits by ABS.<br>0b00 = success for M2M Group<br>0b01 = abort for M2M Group<br>0b10 = continue | |
| If (Ranging Status == 0b01) { | | | |
| Ranging Abort Timer | 16 | Timer defined by an ABS to prohibit the AMS from attempting network entry at this ABS, for a specific time duration.<br>Value: 0 (Do not try ranging again at the ABS.)<br>Value: 1-65535, In units of seconds | |
| }else if (Ranging Status ==0b10) { | | | |
| Adjustment parameters indication (API) | 3 | Bit#0: Time offset adjustment indication.<br>Bit#1: Power level adjustment indication<br>Bit#2: Frequency offset adjustment Indication | |
| If( API Bit#0==0b1 ) { | | | |
| Timing offset adjustment | 15 | | |
| }<br>If( API Bit#1==0b1 ) { | | | |
| Power level adjustment | 4 | | |
| } | | | |

TABLE 9-continued

| Field | Size (bits) | Value/Description | Condition |
|---|---|---|---|
| If (API Bit#2==0b1) { Frequency offset adjustment } } } | 9 | | |

Referring back to FIG. 2, in step 202, the MSs in the group selects a group delegate of the group according to the message sent by the BS.

It should be described that, the group delegate may be selected, but is not limited to, by calculating a formula (mod (group member ID, k) or (mod (group member ID, f(k, frame number)), where k is a positive integer and may be determined by the BS, and f(k, frame number) is a function related to k and the frame number, i.e., the value of f(k, frame number) is related to both k and time. The group delegate may be pre-selected.

It should be also noted that, the group delegate may be selected before step 201, and may be selected by the MS and the BS together as shown in FIG. 4. Thus, there is signaling interaction between the BS and the MS when the group delegate is selected. There are three modes for selecting the group delegate, such as a preconfiguration mode, a random selection mode of the MS, and a cooperation method of the BS (selected by the network) and the MS.

In step 203, the group delegate sends the GDC based on the group ID to the BS in a ranging opportunity.

In step 203, the selection of the ranging opportunity in an example is implemented as follows: if a data frame only includes one ranging opportunity, the GDC is sent in the ranging opportunity; if the data frame includes multiple ranging opportunities, one ranging opportunity is selected from the multiple ranging opportunities according to a formula mod (floor (ID M2M Group, NM2M group), NOpp).

In step 204, each MS in the group receives a RNG-ACK message and/or a group access resource allocation message from the BS.

It should be noted that, after receiving the GDC, the BS sends the RNG-ACK message and/or the group access resource allocation message to the MS, and the message includes three types of information. The first type of information indicates identification and success, such as all or part of MSs in the group are allowed to access the network. The second type of information indicates that the GDC continues to be sent to correct timing, frequency offset and power adjustment, and if receiving this information, the group delegate should perform adjustment according to the information, and then performs step 203. The third type of information indicates abort or prohibiting sending, such as rejecting the group to access the network, at the same time, a timer may be configured for the MSs in the group, and the MSs in the group can access the network again when the timer expires. The time duration of the timer may be configured with a new value, and may be referred to as a group timer. The value may be configured according to practical requirements, and may be different from the time duration of a conventional timer for abort in the network. The above three types of information may be used individually or in combination. For example, the first type of information may be given to one part of group members in the group, and the third type of information may be given to the other one part of group members in the group.

It should also be noted that, if the GDC obtained by the BS does not meet the requirements of the BS, the BS includes a continue instruction in the message sent by the BS to make the group continue in sending the GDC, generally make the group delegate sending the GDC last time continue in sending the GDC, and further guarantee that the BS can correctly receive the GDC. Table 9 shows ACK information of group ranging codes which is added in a ranging ACK signaling sent to the MSs in the group by the BS.

As mentioned previously, if the MSs receive continue or abort information from the BS, the selected group delegate is not changed; however, if the MSs receive success information, the selected group delegate changes back into a group member.

It should also be noted that, if there is a time difference between the MSs, in order to prevent losing the information sent by the BS, the group members and/or the group delegate may need to receive the information from the BS in advance.

The MSs in the group will respond to different ACK information with different responses. For example, if success information is received as shown in FIG. 2, the MSs will obtain an initial value and end value of a backoff window, and access the network after performing backoff processing. It should be noted that, when the initial value and end value of the backoff window are defined, a window space larger than that of a general subscriber is considered to decrease conflict and access delay caused when a large number of M2M access the network. Abort information indicates that all or a particular part of MSs in the group will access the network after a delay time (according to an abort timer). Continue information indicates that the group delegate in the M2M group will adjust its own timing or power parameters to continue sending the GDC of the group.

TABLE 10

| Syntax | Size (bit) | Description |
|---|---|---|
| Initial ranging backoff start for M2M Group | 4 | Initial backoff window size for initial ranging contention, expressed as a power of 2. Values of n range 0-15 |
| Initial ranging backoff end for M2M Group | 4 | Final backoff window size for initial ranging contention, expressed as a power of 2. Valuesof n range 0-15 |

In step 205, the MSs allowed accessing the network in the group receive backoff information which is sent by the BS and is contained in a superframe header for the group, individual or the prior art, perform backoff processing, select a ranging opportunity after the backoff processing, randomly select an IRC, and send the IRC to the BS.

In step 206, the MSs sending the IRC receive a RNG-ACK message and/or a CDMA Allocation A-MAP IE message from the BS, where the RNG-ACK message and/or the CDMA Allocation A-MAP IE message includes a response of the BS to the detected IRC.

In step 207, the MSs send a RNG-REQ message to the BS after receiving the RNG-ACK message containing success ACK information of the ranging signal, and/or receiving a corresponding CDMA Allocation A-MAP IE message, and/or receiving a corresponding group access resource allocation message, to inform the BS of information containing the MSs' IDs, and continue in accessing the network.

FIG. 3 illustrates an example operation between an MS and a BS for the MS to access the network in a mobile communication system according to a second embodiment of the present invention. Although not shown in the drawings, each of the MS and the BS includes at least a sender, a receiver, and a controller, and the sender and the receiver transmit and receive messages, and the controller of the MS and BS controls the operations according to the second embodiment of the present invention.

Referring to FIG. 3, in step 301, MSs in a group determine a GDC of the group and corresponding resources according to a message sent by a BS.

In step 302, the MSs in the group determine a group delegate of the group according to the message sent by the BS. It should be note that, step 302 may be performed before step 301, and the determining of the group delegate is the same as step 201 of FIG. 2, and will not be described in detail.

In step 303, the group delegate sends the GDC of the group to the BS in a ranging opportunity.

In step 304, each MS in the group receives a RNG-ACK message and/or a group access resource allocation message from the BS.

In step 305, the MSs allowed to access the network in the group send an IRC pre-allocated to the MS to the BS in the ranging opportunity. The ranging opportunity may be pre-allocated to the MS.

It should be noted that, in step 305, each MS allowed to access the network in the group may be preconfigured with the ranging opportunity and IRC to reduce or eliminate any conflicts from occurring when the MSs are allowed to access the network in the group access the network, and further allow the MSs to successfully access the network.

In step 306, the MSs sending the IRC listen to and receive a RNG-ACK message and/or a CDMA Allocation A-MAP IE message from the BS, where the RNG-ACK message and/or the CDMA Allocation A-MAP IE message includes a response of the BS to the detected IRC.

In step 307, the MSs send a RNG-REQ message to the BS after receiving the RNG-ACK message including success ACK information of the ranging signal, and/or receiving a corresponding CDMA Allocation A-MAP IE message, and/ or receiving a group access resource allocation message, to inform the BS of information containing the MSs' IDs, and continue in accessing the network.

The difference between the first embodiment and the second embodiment lies in the difference between step 205 and step 305.

The sequence of step 201 and step 202 may be changed as long as the two steps are performed before step 203. In some cases, the time of performing the two steps in advance is not limited. Similarly, steps 301 and 302 are similar with steps 201 and 202.

It should be noted that, steps 205 through 206 and steps 305 through 306 may be omitted in some cases. Steps 201 and/or 202 and steps 301 and/or 302 may be implemented according to a third embodiment.

FIG. 4 illustrates an example method for selecting a group delegate through communication between an MS and a BS according to certain embodiments of the present invention.

In step 401, a MS in the group receives a message sent by the BS, determines information of the group to which the MS belongs and the configuration of the group, which include at least one of: a group ID, a GDC and corresponding resources, such as a corresponding ranging opportunity, a frame number, a Group ID, a paging group ID, and so on.

In step 402, the MSs in the group determine the group delegate of the group according to the message sent by the BS. The message sent by the BS includes at least one of: the value k (referring to step 202), a time parameter for selecting the group delegate, such as a frame number or a superframe number (referring to "(mod (group member ID, f(k, frame number)") in step 202), and the number of MSs in the group.

In step 403, the MS that will become the group delegate sends a message to the BS, to inform the BS that the MS will become the group delegate.

In step 404, the BS sends a message to the MSs in the group, and responds to the MS which will become the group delegate. The response may be sent to the group delegate or to the group.

The IRC in the above embodiments may be an IRC in the conventional system, and may also be an IRC specially allocated to the MSs in the group. The IRC in the above embodiments may be sent in a ranging opportunity in the conventional system, and may also be sent in a ranging opportunity specially allocated to the MSs in the group. In additional, as in the ranging opportunity in the conventional system, both the IRC in the conventional system and the IRC specially allocated to the MSs in the group may be sent.

In the above embodiments, the M2M group and the ranging opportunity are only examples, and the method may be applied to other groups and opportunities in practical applications.

In summary, in the network access method of the MS provided by the embodiments of the present invention, a large number of MSs are delegated in groups, the group delegate in each group may request the BS through one or more GDCs to access the network, after receiving the message of allowing accessing the network, the MSs in this group send the IRC request or directly sends the RNG-REQ message to the BS to access the network. Since the MSs are delegated in groups in the various embodiments of the present invention, the number of MSs sending the access codes is decreased relatively, and thus the conflict occurred when the MSs access the network can be decreased.

Further, in the embodiments of the present invention, the MSs allowed to access the network in the group may be configured with different IRCs, so that the MSs request to access the network with different IRCs to reduce or eliminate any conflicts when the MSs access the network.

As can be seen, since the MSs are delegated in groups, that is, the number of MSs sending the IRC in a period of time is decreased, potential conflicts when the MSs access the network can be decreased.

Further, in the present invention, the MSs in the group which are allowed to access the network may be allocated with different IRCs, so that each MS may request to access the network using different IRCs, to avoid any conflicts when the MSs access the network.

Other various effects may have been directly or implicitly disclosed in the detailed description according to the embodiments of the present invention.

The foregoing is only the preferred examples of the present invention and is not used to limit the protection scope of the present invention. Any modification, equivalent substitution and improvement without departing from the principle of the present invention are within the protection scope of the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a terminal in a communication system, the method comprising:
   receiving a ranging-response (RNG-RSP) message comprising a ranging status for a group from a base station (BS), wherein the group includes the terminal and a group delegate terminal; and
   if the ranging status for the group indicates success, transmitting a first ranging code to the BS,
   wherein the ranging status for the group includes a ranging status for a second ranging code transmitted by the group delegate terminal of the group.

2. The method of claim 1, wherein the at least one terminal waits for receiving the RNG-RSP message for a predetermined period of time.

3. The method of claim 1, wherein transmitting the first ranging code to the BS comprises transmitting the first ranging code for the terminal to the BS to initiate a network reentry procedure.

4. The method of claim 1, further comprising, if the ranging status for the group is abort, starting a ranging abort timer and aborting a ranging procedure until the ranging abort timer expires.

5. The method of claim 1, further comprising, if the ranging status for the group is continue, adjusting, by the group delegate terminal, a parameter of the second ranging code transmitted by the group delegate terminal and transmitting the first ranging code comprising the adjusted parameter to the BS.

6. The method of claim 1, wherein the group delegate terminal is randomly selected among a plurality of terminals comprised in the group.

7. The method of claim 1, wherein if the ranging status for the group indicates success, the group delegate terminal is changed.

8. The method of claim 4, wherein if the ranging status for the group is abort, the group delegate terminal is not changed.

9. The method of claim 5, wherein if the ranging status for the group is continue, the group delegate terminal is not changed.

10. The method of claim 1, wherein the second ranging code transmitted by a group delegate terminal is orthogonal with an additional ranging code for an application, the additional ranging code being generated from a Zadoff-Chu sequence having a cyclic shift function.

11. The method of claim 10, further comprising providing four ranging opportunities in which the second ranging code transmitted by a group delegate terminal and the additional ranging code are configured in a single frame.

12. The method of claim 10, further comprising providing one ranging opportunity in which the second ranging code transmitted by a group delegate terminal and the additional ranging code are configured in a single frame.

13. The method of claim 10, further comprising providing two ranging opportunities in which the second ranging code transmitted by a group delegate terminal and the additional ranging code are configured in a single frame.

14. A method by a base station (BS) in a communication system, the method comprising:
   receiving a first ranging code for a group from a group delegate terminal, the first ranging code dedicated to the group delegate terminal, wherein the group includes a terminal and the group delegate terminal; and
   transmitting a ranging-response (RNG-RSP) message in response, which comprises a ranging status for the group and the first ranging code to a plurality of terminals comprised in the group.

15. The method of claim 14, further comprising, if the ranging status for the group is continue, receiving, from the group delegate terminal, a second ranging code in which a parameter of the first ranging code for the group is adjusted.

16. The method of claim 14, wherein the group delegate terminal is randomly selected among the terminals.

17. The method of claim 14, wherein if the ranging status for the group indicates success, the group delegate terminal is changed.

18. The method of claim 14, wherein if the ranging status for the group is at least one of abort or continue, the group delegate terminal is not changed.

19. The method of claim 14, wherein the first ranging code for the group is orthogonal with an additional ranging code for an application, the additional ranging code being generated from a Zadoff-Chu sequence having a cyclic shift function.

20. The method of claim 19, further comprising four ranging opportunities in which the first ranging code for the group and the additional ranging codes are configured in a single frame.

21. The method of claim 19, further comprising one ranging opportunity in which the first ranging code for the group and the additional ranging code are configured in a single frame.

22. The method of claim 19, further comprising two ranging opportunities in which the first ranging code for the group and the additional ranging code are configured in a single frame.

23. An apparatus in a terminal in a communication system, the apparatus comprising:
   a controller;
   a receiver configured to receive a ranging-response (RNG-RSP) message comprising a ranging status for a group from a base station (BS), wherein the group includes the terminal and a group delegate terminal; and
   a transmitter configured to, if the ranging status for the group indicates success, transmit a first ranging code to the BS,
   wherein the ranging status for the group includes a ranging status for a second ranging code transmitted by the group delegate terminal of the group.

24. The apparatus of claim 23, wherein the at least one terminal is configured to wait for receiving the RNG-RSP message for a predetermined period of time.

25. The apparatus of claim 23, wherein if the ranging status for the group indicates success, the transmitter is configured to transmit the first ranging code for the terminal to the BS to initiate a network reentry procedure.

26. The apparatus of claim 23, wherein if the ranging status for the group is abort, the controller is configured to control the at least one terminal to start a ranging abort timer and abort a ranging procedure until the ranging abort timer expires.

27. The apparatus of claim 23, wherein if the ranging status for the group is continue, the controller is configured to control the terminal to adjust a parameter of the second ranging code transmitted by a group delegate terminal and transmit the first ranging code comprising the adjusted parameter to the BS.

28. The apparatus of claim 23, wherein the at least one terminal is configured to randomly select the group delegate terminal.

29. The apparatus of claim 23, wherein the controller is configured to, if the ranging status for the group indicates success, change the group delegate terminal.

30. The apparatus of claim 26, wherein the controller is configured to, if the ranging status for the group is abort, not change the group delegate terminal.

31. The apparatus of claim 27, wherein the controller is configured to, if the ranging status for the group is continue, not change the group delegate terminal.

32. The apparatus of claim 23, wherein the second ranging code transmitted by a group delegate terminal is orthogonal with an additional ranging code for application, and the controller is configured to generate an additional ranging code from a Zadoff-Chu sequence having a cyclic shift function.

33. The apparatus of claim 32, further comprising four ranging opportunities in which the second ranging code transmitted by a group delegate terminal and the additional ranging code are configured in a single frame.

34. The apparatus of claim 32, further comprising one ranging opportunity in which the second ranging code transmitted by a group delegate terminal and the additional ranging code are configured in a single frame.

35. The apparatus of claim 32, further comprising two ranging opportunities in which the second ranging code transmitted by a group delegate terminal and the additional ranging code are configured in a single frame.

36. An apparatus in a base station (BS) in a communication system, the apparatus comprising:
a controller;
a receiver configured to receive a first ranging code for a group from a group delegate terminal, wherein the first ranging code for the group is dedicated to the group delegate terminal, wherein the group includes the terminal and the group delegate terminal;
a transmitter configured to transmit a ranging-response (RNG-RSP) message in response, which comprises a ranging status for the group to a plurality of terminals comprised in the group; and
if the ranging status for the group indicates success, receiving a second ranging code for each terminal from each of the terminals.

37. The apparatus of claim 36, wherein the receiver is configured to, if the ranging status for the group is continue, receive the second ranging code in which a parameter of the first ranging code for the group is adjusted from the group delegate terminal.

38. The apparatus of claim 36, wherein the terminals are configured to randomly select the group delegate terminal.

39. The apparatus of claim 36, wherein the terminals are configured to, if the ranging status for the group indicates success, change the group delegate terminal.

40. The apparatus of claim 36, wherein the terminals are configured to, if the ranging status for the group is abort or continue, not change the group delegate terminal.

41. The apparatus of claim 36, wherein the first ranging code for the group is orthogonal with an additional ranging code for application, the controller is configured to generate an additional ranging code from a Zadoff-Chu sequence having a cyclic shift function.

42. The apparatus of claim 41, further comprising four ranging opportunities in which the first ranging code for the group and the additional ranging code are configured in a single frame.

43. The apparatus of claim 41, further comprising one ranging opportunity in which the first ranging code for the group and the additional ranging code are configured in a single frame.

44. The apparatus of claim 41, further comprising two ranging opportunities in which the first ranging code for the group and the additional ranging code are configured in a single frame.

45. The method of claim 1, wherein the first ranging code transmitted by a group delegate terminal is a dedicated ranging code for the group.

46. The method of claim 14, wherein the first ranging code for the group is a dedicated ranging code for the group.

47. The apparatus of claim 23, wherein the first ranging code transmitted by a group delegate terminal is a dedicated ranging code for the group.

48. The apparatus of claim 36, wherein the first ranging code for the group is a dedicated ranging code for the group.

49. A method, by a group delegate terminal of a group comprising a plurality of terminals, in a communication system, the method comprising:
selecting a first ranging code from a ranging code set based on a group identifier;
transmitting the first ranging code to a base station (BS);
receiving a ranging-response (RNG-RSP) message comprising a ranging status for a group from the BS; and
if the ranging status for the group indicates success, transmitting a second ranging code for the group delegate terminal to the BS.

50. An apparatus in a group delegate terminal of a group comprising a plurality of terminals, in a communication system, the apparatus comprising:
a controller configured to select a first ranging code from a ranging code set based on a group identifier;
a transmitter configured to transmit the first ranging code to a base station (BS); and
a receiver configured to receive a ranging-response (RNG-RSP) message comprising a ranging status for a group from the BS,
wherein the transmitter configured to, if the ranging status for the group indicates success, transmit a second ranging code for the group delegate terminal to the BS.

* * * * *